(12) United States Patent
Li et al.

(10) Patent No.: US 8,884,049 B2
(45) Date of Patent: Nov. 11, 2014

(54) GLYCEROL BASED POLYMER SURFACE ACTIVE CHEMISTRY AND PRODUCTION

(75) Inventors: Xiaojin Harry Li, Palatine, IL (US); Prasad Duggirala, Naperville, IL (US); Joanna L. Shih, Downers Grove, IL (US)

(73) Assignee: Nalco Company, Naperville, IL (US)

( * ) Notice: Subject to any disclaimer, the term of this patent is extended or adjusted under 35 U.S.C. 154(b) by 398 days.

(21) Appl. No.: 13/484,526

(22) Filed: May 31, 2012

(65) Prior Publication Data
US 2012/0238776 A1    Sep. 20, 2012

Related U.S. Application Data

(63) Continuation-in-part of application No. 12/582,827, filed on Oct. 21, 2009.

(51) Int. Cl.
| C07C 67/00 | (2006.01) |
| C08G 65/34 | (2006.01) |
| C08G 65/48 | (2006.01) |

(52) U.S. Cl.
CPC ............... C08G 65/34 (2013.01); C08G 65/48 (2013.01)
USPC .......................................... 560/187; 549/378

(58) Field of Classification Search
CPC ................................ C08G 65/34; C08G 65/48
USPC .......................................... 560/187; 549/378
See application file for complete search history.

(56) References Cited

U.S. PATENT DOCUMENTS

| 2,023,388 A | 12/1935 | Harris |
| 2,258,892 A | 10/1941 | Harris |
| 3,637,774 A | 1/1972 | Babayan |
| 4,551,561 A | 11/1985 | Stuhler et al. |
| 5,198,532 A | 3/1993 | Blytas et al. |
| 5,399,371 A * | 3/1995 | Harris .......................... 426/611 |
| 5,641,816 A | 6/1997 | Klein et al. |
| 6,620,904 B2 | 9/2003 | Lemke et al. |
| 6,683,222 B2 | 1/2004 | Nakamura et al. |
| 6,822,068 B2 | 11/2004 | Sunder et al. |
| 8,101,045 B2 | 1/2012 | Furman et al. |

(Continued)

FOREIGN PATENT DOCUMENTS

| CN | 101186696 A | 5/2008 |
| EP | 0719752 B1 | 3/2008 |

(Continued)

OTHER PUBLICATIONS

International Search Report from PCT Application PCT/US2013/043506 mailed Sep. 30, 2013.

Primary Examiner — Rosalynd Keys
(74) Attorney, Agent, or Firm — Benjamin E. Carlsen (57) ABSTRACT

The invention provides a method of efficiently producing branched, cyclic glycerol-based polymer surface active products having ester and alkyl functional groups with a co-product as anti-biodegrading agent from inexpensive readily available glycerol monomer. The method involves polymerizing glycerol or glycerol with at least another monomer to multiple other monomers in the presence of particular amount of a strong base as the catalyst under a particular distillation environment. The polyol then undergoes esterification, alkylation and crosslinking in presence of particular amount of a catalyst under a particular low activity atmospheric environment. The glycerol-based polymer surface active products produced by the inventive method are beneficial for reducing lignin, extractives and rejects levels in pulping process of papermaking industry.

19 Claims, 3 Drawing Sheets

(56) References Cited

U.S. PATENT DOCUMENTS

| | | |
|---|---|---|
| 2002/0058781 A1 | 5/2002 | Lemke et al. |
| 2006/0286052 A1 | 12/2006 | Oki et al. |
| 2008/0282579 A1 | 11/2008 | Bobbett et al. |
| 2008/0306211 A1 | 12/2008 | Lemke et al. |
| 2009/0082483 A1 | 3/2009 | Petrovic et al. |
| 2009/0130006 A1 | 5/2009 | Wang et al. |
| 2009/0239958 A1 | 9/2009 | Sakanishi et al. |
| 2011/0092743 A1 | 4/2011 | Li et al. |

FOREIGN PATENT DOCUMENTS

| | | |
|---|---|---|
| JP | 3717193 B2 | 11/2005 |
| WO | 2007049950 A2 | 5/2007 |
| WO | 2007049950 A3 | 5/2007 |

* cited by examiner

GLYCEROL BASED POLYMER SURFACE ACTIVE CHEMISTRY AND PRODUCTION

CROSS-REFERENCE TO RELATED APPLICATIONS

This application is a continuation-in-part of U.S. patent application Ser. No. 12/582,827 which was filed on Oct. 21, 2009.

STATEMENT REGARDING FEDERALLY SPONSORED RESEARCH OR DEVELOPMENT

Not Applicable.

BACKGROUND OF THE INVENTION

This invention relates to compositions of glycerol (glycerin or glycerine) based polymer surface active chemistry and methods of producing the unique chemistry compositions. The unique surface active chemistry is branched and cyclic, and has both alkyl ether and ester functionalities along with a beneficial co-product lactic acid and/or lactate salt as an anti-biodegrading agent. The glycerol-based surface active products from this chemistry are produced in a continuous process using a unique formula under a particular low activity atmospheric environment.

Conventionally, syntheses of polyglycerol alkyl ethers and esters are based on polyglycerols. For synthesizing polyglycerols, glycidol-based synthesis is particularly useful in producing structured or hyperbranched polyglycerols (HBPG) and high molecular weight HBPG, such as those described in U.S. Pat. No. 6,822,068 B2 and US Published Application 2008/282579 A1. Alternatively, glycidol is used to directly react with fatty alcohols to produce polyglycerol alkyl ethers in one step as described in US Patent Application 2009/0239958. Unfortunately these syntheses rely on expensive monomer glycidol which is often so expensive that in many cases their use on an industrial scale is cost prohibitive.

A number of production processes have been developed for synthesis of glycerol-based polyols, particularly polyglycerols, from inexpensive monomer glycerol. However, these syntheses are mostly limited to producing linear or at least mostly linear, low molecular weight polyglycerols (or oligoglycerols). U.S. Pat. No. 2,258,892 describes various reaction conditions for synthesizing polyglycerols at reaction temperature 200 to 260 degrees Celsius employing 1% of a caustic or salt by weight as the catalyst relative to glycerol used, but only oligomeric polyglycerol products were produced (mean molecular weight: 116 to 314 Daltons). In U.S. Pat. No. 5,641,836, 0.12% of LiOH or lithium soaps under nitrogen atmosphere were used. In U.S. Pat. No. 6,620,904 B2 0.1% of calcium hydroxide under vacuum was used. In WO 2007/049950 A2, 1% of a weak acid alkaline metal salt was used. In each of these cases, however, only oligomeric polyglycerols were produced.

Another strategy used in the prior art is the use of small amounts of strong bases. In EP 0719752 B1 1% of sodium hydroxide under vacuum or nitrogen was used. JP 3717193 describes using 0.5% of sodium hydroxide under nitrogen. US Application 2008/306231 A1 describes using 0.3% or 0.4% of KOH. Again however the only major product was oligomeric polyglycerols or olygomeric glycerol-based polyols. Other methods are described in U.S. Pat. Nos. 3,637,774, 4,551,561, and 5,198,532, Chinese Patent Application CN 101186696A and Scientific Article *Determination of the Optimum Conditions for the Condensation of Glycerin in the Presence of Potassium Hydroxide*, D. A. Zhukov, et al., Zhurnal Prikladoni Khimii, Vol. 57, No. 2, pp. 389-392 (1984). Unfortunately these methods also only produce linear polyglycerols.

Although glycerol is not expensive, the current processes for the glycerol-based condensation polymerizations are often inefficient. The resulting polyols are linear and often have rather low molecular weights. Therefore, etherification or esterification of the polyglycerols only results in linear and relative low molecular weight polyglycerol alky ethers or esters, such as descried in U.S. Pat. No. 2,023,388.

Additionally in prior arts branched or hyperbranched alkyl ethers are produced based on glycerol as described in U.S. Pat. No. 6,683,222 B2, and the structured surface active products are superior to the traditional linear ones in various applications. However, the production requires multiple steps and separations, and use hydrogen peroxide as an epoxidation reagent which is of a safety concern in industrial scale. The process inefficiency and safety concern of the synthesis are limiting factors for scaling up. In US Patent Application 2006/0286032 A1, polyglycerol branched esters are synthesized using branched fatty acid, and are superior to the linear esters in cosmetic applications. However, the branched structured are derived only from the fatty acids used and therefore the esters are dimensionally very limited comparing to the esters synthesized from branched polylgycerols. In addition these prior art methods lack cyclic, crosslinked structures and any anti-biodegrading agents. Thus there is a clear need for and utility in an improved method of synthesizing glycerol-based polymer surface active products. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment of the invention is directed towards a method of synthesizing glycerol-based surface active products in a continuous process under a low reactivity atmospheric environment. The method comprises the steps of: a) reacting a reaction mass comprising at least glycerol monomer in the presence of a strong base catalyst of a concentration of above 2% at a temperature above 200 degrees C. which produces a first product comprising polyols which are both branched and cyclic, and a co-product comprising lactic acid, lactic salt, and any combination thereof, b) esterifying the first product in presence of an acid catalyst of a concentration above 5% at a temperature above 115 degrees C. to produce a second product, c) alkylating the second product at a temperature above 115 degrees C. to form a third product, and d) crosslinking the third product at a temperature above 115 degrees C. to form an end product.

At least 0.1% of the produced polyols in the step a may be: alkylated, esterified, crosslinked and any combination thereof. The Esterification reaction may esterify at least 0.1% of the co-product lactic acid to the produced polyols. The esterification reaction may be accomplished by adding at least one additional C2-C50 hydrocarbon acid in the step b. The alkylation may be accomplished by adding at least one C4-C50 hydrocarbon alcohol or the like to the second product. The glycerol monomer may at least in part comprise glycerol from crude glycerin and the crude glycerin further comprises methyl esters, methanol, mong and inorganic salts and water.

The acid catalyst may be selected from the group consisting of: phosphoric acid, sulfuric acid, p-toluenesulfonic acid, organic acid, Lewis acid and any combination thereof. The base catalyst may be selected from the group consisting of: NaOH, KOH, CsOH, a base stronger than NaOH, and any combination thereof. The atmospheric environment may be an atmospheric pressure of less than 760 mm Hg and/or a flow of an inert gas selected from the list of $N_2$, $CO_2$, He, other inert gases and any combination thereof. The flow may be at a rate of 0.2 to 15 mo 3 of inert gas per hour per mol of monomer (s).

The produced glycerol-based polyols in step a may be selected from the group consisting of polyglycerols, polyglycerol derivatives, a polyol having both glycerol monomer units and non-glycerol monomer units and any combination thereof, and the polyols have at least two hydroxyl groups. At least a portion of the produced polyols in step a may have both at least a 0.1 degree of branching and at least a 0.01 degree of cyclization, and at least a portion of the end product has both a 0.1 degree of branching and at least a 0,01 degree of cyclization. The co-product may be at least 1% by weight. The produced glycerol-based polyols in step a may be at least 166 Daltons in molecular weight, and the produced end product may be at least 500 Daltons in molecular weight. The end product may have a polydispersity of at least 1. The acid catalyst may be added portionwise in step b, step e, step d and any combination thereof. The acid catalyst may be 8.6% to 20.0%. The glycerol-based polymer surface active products may comprise at least one lactic acid, fatty acid, fatty alcohol, a reaction product thereof and any combination thereof. The glycerol-based surface active products may be produced by steps a, b, c and d and any combination thereof.

BRIEF DESCRIPTION OF THE DRAWINGS

A detailed description of the invention is hereafter described with specific reference being made to the drawings in which.

DETAILED DESCRIPTION OF THE INVENTION

Definitions

The following definitions are provided to determine how terms used in this application, and in particular how the claims, are to be construed. The organization of the definitions is for convenience only and is not intended to limit any of the definitions to any particular category.

"Crude glycerin" means a by-product derivative from a transesterification reaction involving triglycerides including transesterification reactions involving biodiesel manufacturing processes, in which the by-product comprises glycerin and at least one component selected from the list consisting of: fatty acids, esters, salt, methanol, tocopherol, sterol, mono-glycerides, di-glycerides, and tri-glycerides.

Figure 1:
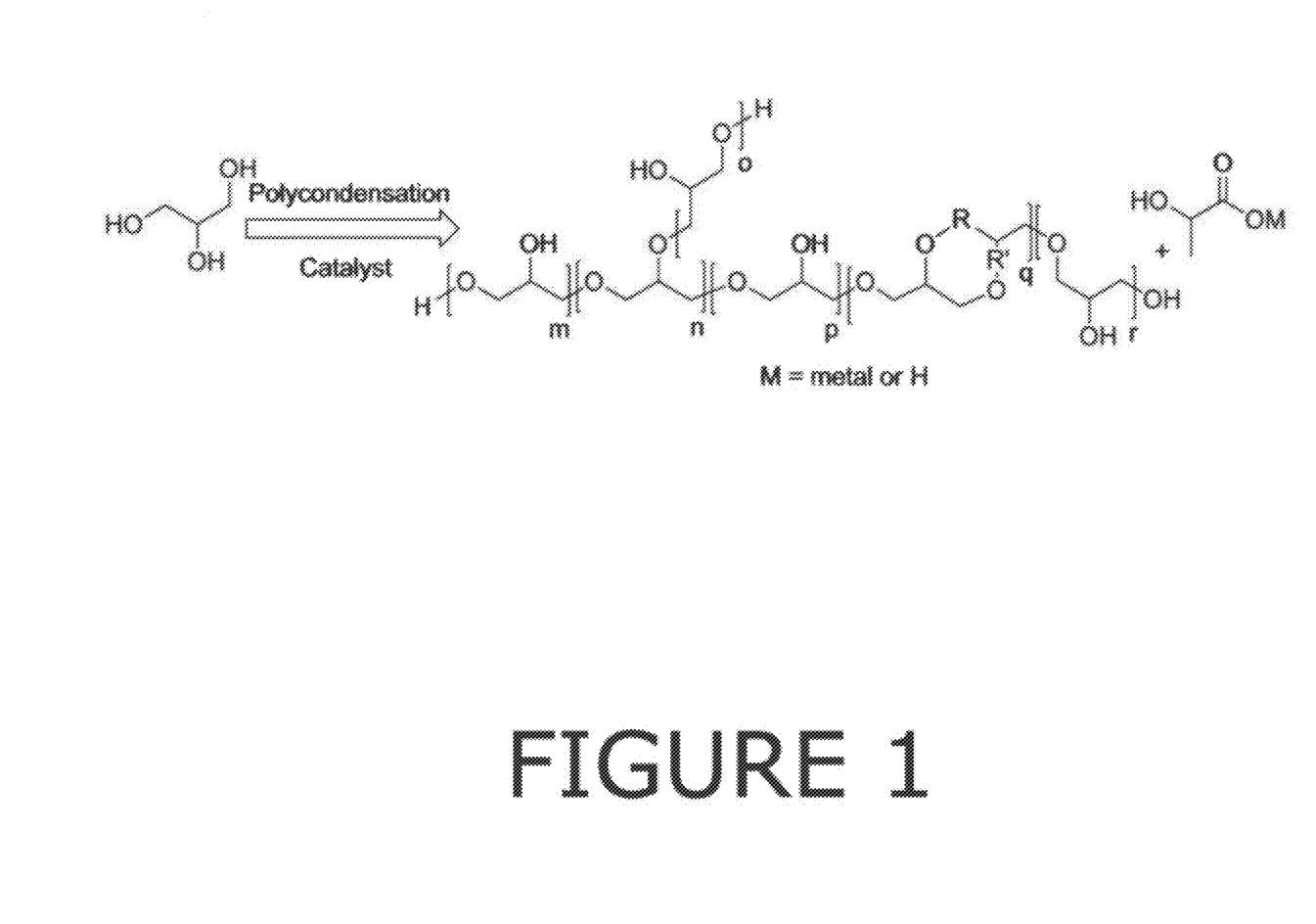
FIG. 1 is an illustration of an inventive polymerization reaction.

"Degree of Branching" or DB means the mol fraction of monomer units at the base of a chain branching away from the main polymer chain relative to a perfectly branched dendrimer, determined by $^{13}C$ NMR based on known literature method described in *Macromolecules*, 1999, 32, 4240. Cyclic units or branched alkyl chains derived from fatty alcohols or fatty acids are not included in the degree of branching. In a perfect dendrimer the DB is 1 or 100%. FIG. 1 illustrates a compound with a DB of ½.

"Degree of cyclization" or DC means the mol fraction of cyclic structure units relative to the total monomer units in a polymer. The cyclic structure units can be formed by intramolecular cyclization of the polyols or any other ways to incorporate in the polyols. The cyclic structure units comprise basic structure units (V, VI and VII of FIG. 2) and the analogues thereof. The degree of cyclization may be determined by $^{13}C$ NMR.

"Glycerol-based polyols" means any polymers containing repeating glycerol monomer units such as polyglycerols, polyglycerol derivatives, and a polymer consisting of glycerol monomer units and at least another monomer units to other multiple monomers units regardless of the sequence of monomers unit arrangements. These polymers also comprise at least two or multiple free hydroxyl groups.

"Hyperbranched" means a polymer, which is highly branched with three-dimensional tree-like structures or dendritic architecture.

"Low reactivity atmospheric environment" is an atmospheric environment which is less reactive than the standard earth environment, which is achieved by substituting the atmospheric environment with an inert gas such as nitrogen, $CO_2$, He, and any combination thereof, and/or by reducing the atmospheric pressure to less than 760 mm Hg or even to vacuum conditions.

"Mong" means non glycerol organic material and typically consists of soaps, free fatty acids, and other impurities.

"Solids" means all starting materials used in the reaction except for solvents and water. Solids, includes but is not limited to products, co-products or by-products and any starting materials.

"Acyl" means a group or radical having the general formula of RCO-derived from an organic acid, where R is a hydrocarbon-based substituent.

In the event that the above definitions or a definition stated elsewhere in this application is inconsistent with a meaning (explicit or implicit) which is commonly used, in a dictionary, or stated in a source incorporated by reference into this application, the application and the claim terms in particular are understood to be construed according to the definition in this application, and not according to the common definition, dictionary definition, or the definition that was incorporated by reference.

Figure 2:
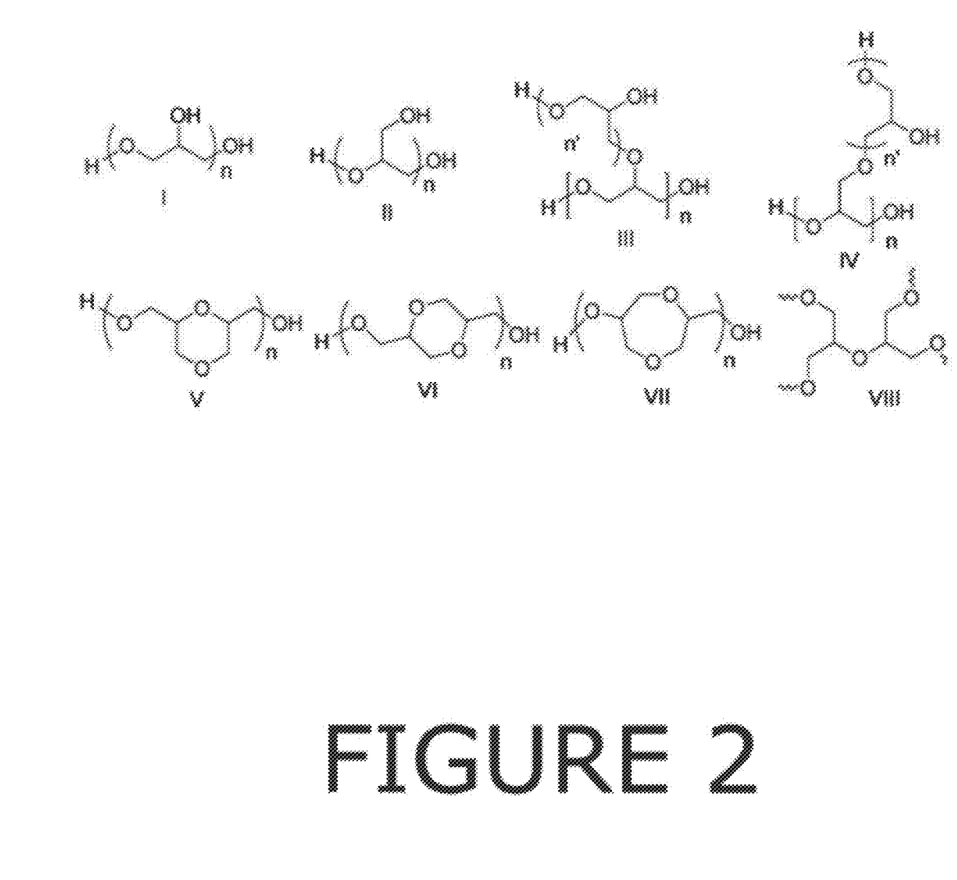
FIG. 2 is an illustration of basic structural units useful with the inventive polymerization reaction.
Figure 3:
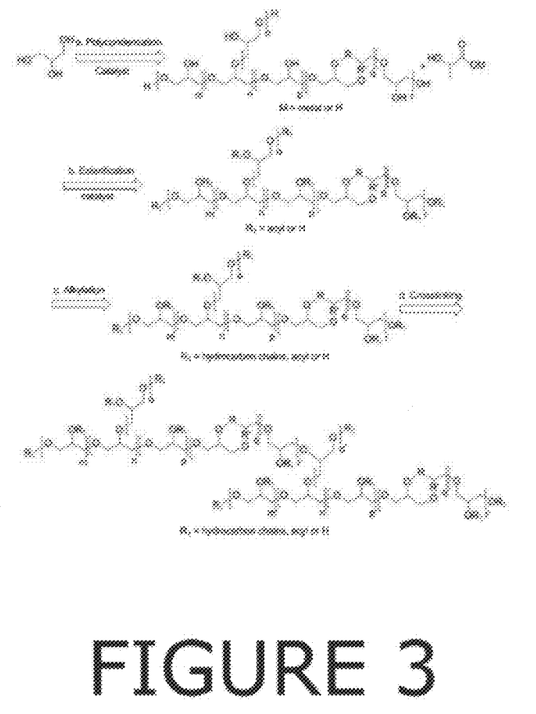
FIG. 3 is an illustration of an inventive continuous polymerization process.

In at least one embodiment the glycerol-based polyol used as the backbone of the surface active polymer chemistry is synthesized according to the methods and compositions described in U.S. patent application Ser. No. 12/582,827. As illustrated in FIG. 1, in at least one embodiment, a unique composition of glycerol-based polyol is produced from glycerol using an improved method. The polyol comprises a structure including at least two repeating units selecting from at least one of the structures listed in FIG. 2 including but not limited to structures I and II, branched structures III, IV, and VIII, cyclic structures V, VI, VII and any combination thereof. Any structure in FIG. 2 can be combined with any structure or structures including itself through any free hydroxyl group functionality in the structure. The cyclic linkages of any basic cyclic structures in FIG. 2 may contain any structure or structures as a part or parts of linkages. In FIG. 1, FIG. 2 and FIG. 3 the numbers m, m', n, n', o, o', p, p', q, q', r and r' in each structure can independently be any numeric number 0, 1, 2, ..., m, m' ... r, or r'. In FIG. 1 R and R' are $(CH_2)_n$ and n can independently be 1 or 0, and M can be H, metal or other counterion.

In at least one embodiment, a unique composition of glycerol-based polyol is produced from glycerol and at least one or more other monomers. Suitable monomers are any polyols or hydrogen active compounds such as those described in U.S. Pat. No. 6,822,068 B2, such as pentaerythritol, glycols, amines, etc. capable of reacting with glycerol or any polyglycerol structures.

In at least one embodiment the unique compositions of glycerol-based polyol products produced by the improved method comprise branched, cyclized structure units in the polyol and co-product lactic acid or lactate salt. In at least one embodiment the glycerol-based polyols have at least 0.1 of degree of branching, preferentially from 0.2 to 0.5, and a degree of cyclization at least 0.01, preferentially 0.02 to 0.19. In at least one embodiment the valuable co-product lactic acid or and lactate salt produced in the invention is at least 3%, preferentially 5% to 30%, by weight in the product solids. In at least one embodiment the valuable co-product is subsequently used for esterification to produce the glycerol-based polymer surface active products. The produced lactic acid or lactic salt is particularly useful as it protects the glycerol-based polyols from bacterial and fungal spoilage. Biochallenge experimental tests show that the polyglycerol products are not susceptible to biological infestation such as from bacteria or fungi. Experimentally produced samples have gone for over 2 years without biological infestation or spoilage.

In at least one embodiment the inventive method comprises particular concentration of a strong base as the catalyst under a particular distillation environment at high reaction temperature for a desired reaction time. In at least one embodiment the strong base is CsOH, KOH, NaOH, any other strong base stronger than NaOH or any combination thereof in the amount of above 2%, preferably above 3%. In at least one embodiment the particular distillation environment is inert gas flow rates of more than 0.2 mol of inert gas per hour per mol of monomer used. In at least one embodiment the inert gas is nitrogen, carbon dioxide, any other inert gas, or any combination thereof. In at least one embodiment the particular distillation environment is a vacuum pressure of less than 760 mmHg. In at least one embodiment the reaction temperature is above 200 and below 300 degrees Celsius, in at least one embodiment the reaction temperature is from 230 to 260 degrees Celsius. The reaction is conducted over 2 hours to a number of hours as desired.

In at least one embodiment, the reaction produced polyols have a polydispersity of at least 1. In at least one embodiment, the reaction produced polyols have a polydispersity within the range of 1 to 30. For purposes of this application the term "polydispersity" is a term of art whose precise definition is provided in *Principles of Polymerization, 4th Edition*, by George Odion Wiley-InterScience (2004), Introduction pages 18-25.

In at least one embodiment the polyol is made at least in part from the polymerization of crude glycerin. Crude glycerin is derived from a transesterification reaction involving triglycerides. Biodiesel is typically made through a chemical process called transesterification in which vegetable oil or animal fats are converted to fatty acid alkyl esters and crude glycerin by-product. Fatty acids and fatty acid alkyl esters can be produced from oils and fats by base-catalyzed transesterification of the oil, direct acid-catalyzed esterification of the oil and conversion of the oil to fatty acids and subsequent esterification to biodiesel.

The majority of fatty acid alkyl esters are produced by the base-catalyzed method. In general, any base may be used as the catalyst used for transesterification of the oil to produce biodiesel, however sodium hydroxide or potassium hydroxide are used in most commercial processes.

Suitable examples of crude glycerin and its manufacture can be found in among other places in U.S. patent application Ser. No. 12/246,975. In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel and the oils and fats are added. The system can then be closed, and held at about 71 degrees C. (160 degrees F.) for a period of about 1 to 8 hours, although some systems recommend that the reactions take place at room temperature.

Once the reactions are complete the oil molecules (e.g. triglycerides) are hydrolyzed and two major products are produced: 1) a crude fatty acid alkyl esters phase (i.e. biodiesel phase) and 2) a crude glycerin phase. Typically, the crude fatty acid alkyl ester phase forms a layer on top of the denser crude glycerin phase. Because the crude glycerin phase is denser than the biodiesel phase, the two can be gravity separated. For example, the crude glycerin phase can be simply drawn off the bottom of a settling vessel. In some cases, a centrifuge may be employed to speed the separation of the two phases.

The crude glycerin phase typically consists of a mixture of glycerol, methyl esters, methanol, mong and inorganic salts and water. Methyl esters are typically present in an amount of about 0.01 to about 5 percent by weight.

In at least one embodiment, methanol can be present in the crude glycerin in an amount greater than about 5 weight percent to about 30 weight percent. In at least one embodiment, the crude glycerin comprises about 30 to about 95 weight percent of glycerol.

The inventive method has a number of benefits. One advantage is the high proportion of valuable lactic acid or lactate salt present in the reaction product. In at least one embodiment, the lactic acid has been observed to be as much as at least 11% to 22% by weight of the reaction product. The produced lactic acid is particularly useful as it protects the polyglycerol from bacterial and fungal spoilage. Experimentally produced samples have gone for over 2 years without biological infestation or spoilage.

In at least one embodiment the degree of cyclization of the resulting polyol is 0.15 to 0.18.

In at least one embodiment, at least 30 to 35% of the produced polyglycerols are branched or hyperbranched polyglycerols. Branching or hyperbranching is particularly useful as it facilitates increased molecular weight of the polyglycerols. Furthermore as described in US Published Application 2009/0130006 A1 branched and hyperbranched polyglycerols are also capable of reducing scale in Bayer liquor during aluminum processing.

In at least one embodiment the inventive composition of polyols can be used as substitute for other compositions which are used to assist in addressing a number of industrial concerns. As examples: the inventive composition can be used as a substitute tor or additive to the humectant for a Yankee coating according to the methods and procedures described in U.S. Pat. No. 8,101,045 B2. In at least one embodiment the inventive composition can be used as a substitute for or additive to the paper brightening agent according to the methods and procedures described in U.S. patent application Ser. No. 12/499,916.

Without being limited to theory it is believed that the beneficial effects of the inventive process are a result of the unique conditions that the polymerization reaction occurs within. In prior art glycerol-based condensation polymerizations either no catalyst is used, weak bases or organic acid salts of alkaline metals are used, or a low catalyst loading of a strong base as the catalyst, typically from 0.1 to 2% is used. This results in linear or mostly linear glycerol-based polyols, and often low molecular weight glycerol-based polyols. In contrast the inventive process uses a higher amount of a strong base as the catalyst under a particular distillation environment to effectively produce the branched, cyclized glycerol-based polyols in a wide range of molecular weights with a beneficial co-product lactic acid or lactate as anti-biodegrading agent. Furthermore, the low reactivity atmospheric environment removes water that forms as a reaction byproduct, which prevents the water from inhibiting the polymerization reactions.

Referring now to FIG. 3 there is shown an embodiment in which the polyols are used to produce glycerol-based polymer surface active products comprising ester and alkyl ether functionalities and crosslinked structures additionally. In at least one embodiment the esterification, alkylation and crosslinking occur in presence of particular amount of acid(s) as the catalyst under a particular low reactivity atmospheric environment. In at least one embodiment the particular amount of acid catalyst is at least above 5%. In at least one embodiment the acid catalyst is 8.6% to 20.0%. In at least one embodiment the acid catalyst comprised sulfuric acid, phosphoric acid, other inorganic acids, p-toluenesulfonic acid, other organic acids, Lewis acids and any combination thereof. In at least one embodiment the polyglycerols are esterified with a portion of co-product, lactic acid. In at least one embodiment the polyglycerol are esterified with lactic acid, fatty acids added and any combination thereof. In at least one embodiment above 1% of the co-product lactic acid or its metal salt is remained in the end product as an anti-biodegrading agent. In at least one embodiment C2-C50 hydrocarbon based acids is added and esterified with glycerol-based polyols, In at least one embodiment the esterification occurs at above 115° C. and below 200° C. In at least one embodiment the esterification occurs as high a temperature as 200 C or higher. Suitable examples of polyols include glycerol and crude glycerin which have undergone acid or base catalyzed polycondensation or from glycidol which has undergone acid or base catalyzed living polymerization. The glycerol, crude glycerin, and/or polyol can undergo alkylation.

In FIG. 3 the alkylation can continuously occur by reaction of the polyglycerol esters with fatty alcohols, or other hydrocarbon alcohols and other hydrocarbon based nucleophiles under a particular low activity atmospheric environment. In at least one embodiment additional amount of acid catalyst is added in the alkylation step. In at least one embodiment the alkylation occurs at above 115° C. and below 200° C. In at least one embodiment the alkylation occurs at as high a temperature as 200 C or higher. In at least one embodiment the alkylation is accomplished by the alkoxylation and/or the oxyalkylation (with oxyalkenes) of the glycerol, crude glycerin, and/or the polyol. In at least one embodiment the hydrocarbon alcohols or oxyalkenes are C4-C50 hydrocarbon reagents.

In FIG. 3 the crosslinking reaction can continuously occur with or without a crosslinking reagent under a particular low reactivity atmospheric environment. In at least one embodiment the crosslinking occurs at temperature of above 115° C. and below 200° C. In at least one embodiment the crosslinking occurs as high a temperature as 200 C or higher. In at least one embodiment additional acid catalyst is added for the crosslinking reaction. In at least one embodiment the crosslinking adds crosslinked structures and Increases the degree of branching. In at least one embodiment the crosslinking increases molecular weight of the end product FIG. 3 illustrates at least one embodiment in which the inventive composition is synthesized by first polycondensation of suitable monomer units, second esterification of the polymer, third alkylation of the polymer and finally crosslinking. After the polycondensation, a lactate co-product (such as sodium lactate) is formed. In at least, one embodiment the esterification occurs at a temperature of at least 130° C. and forms a polyglycerol-lactate ester. In at least one embodiment the polyglycerol-lactate ester then undergoes alkylation with fatty alcohols at a temperature of at least 150° C. In at least one embodiment the polyglycerol alkyl ethers and esters are crosslinked at a temperature of at least 150° C. to form more structured high molecular weight surface active products.

In at least one embodiment the unique surface active polymer products are produced in a continuous process comprising polycondensation, esterification, alkylation and crosslinking without any separations. In at least one embodiment the unique surface active polymer products are produced y a process comprising polycondensation, esterification, alkylation, crosslinking and any combination thereof.

One advantage of the invention is the resulting surface active products have both ester and alkyl functionalities. The nature of different polarities from both functionalities is a matrix to adjust the surfactancy for improving performance activities in targeted applications. Another advantage of this invention is the cyclic structures. The rigidity of cyclic structures in the polymer backbone uniquely extends the molecular dimensions and increases the hydrodynamic volume, to better act interfacially. The lipophilic nature of the cyclic structures relative to glycerol monomer better balances the surface active property in the polymer backbone. Another advantage of this invention is the crosslinking which increases the molecular weight and degree of branching.

In at least one embodiment the resulting surface active product has both ester and alkyl functionalities.

An advantage of having ester and alkyl functionalities is that it provides a desirable range of polarities for particular surface interactions.

The degree of esterification can be 0.1% to 99%. The degree of alkylation can be 0.1% to 99%. In addition to the inventive surface active products, the resulting end product may contain residues of the added components, and co-products such as hydrocarbon lactate esters.

In at least one embodiment the reaction product is used as a digestion additive for wood pulping as described for example in U.S. patent application Ser. No. 12/720,973. This is because the alkylated glycerol-based polymer surfactants are structured and well-balanced lipophilically and hydrophilically, and therefore are effective at both penetrating within masses of wood-based fibers and at reducing the native lignin in the wood-based fibers.

EXAMPLES

The foregoing may be better understood by reference to the following Examples, which are presented for purposes of illustration and are not intended to limit the scope of the invention:

A number of samples of the inventive composition were created by using various permutations of the inventive concept.

General Experimental Procedure:

100 Units (or using different amounts) of glycerol were added to a reaction vessel followed by 3.6% of active NaOH relative to the reaction mixture. This mixture was agitated and then gradually heated up to 240° C. under a particular low reactivity atmospheric environment. This temperature was sustained for at least three hours to achieve the desired polyglycerol composition, while being agitated under a particular low reactivity atmospheric environment. An in-process polyglycerol sample was drawn for the molecular weight/composition analysis. The vessel was then allowed to cool down, and 4 to 20% of active acid(s) was added. The mixture was again gradually heated up to 130° C.-150° C. and kept there for at least 30 minutes under a particular low reactivity atmospheric environment, to achieve the desired esterification. A 5 to 40% amount of C10-C16 alcohols was then added and the mixture was heated up to 150° C. and kept there under a particular low reactivity atmospheric environment for at least 30 minutes to achieve the desired alkylation. The resulting reaction mixture was stirred at 150° C. under a particular low reactivity atmospheric environment for at least 30 minutes to achieve the crosslinking to produce the desired end product. 3 to 16 Hours of the reaction time for esterification, alkylation and crosslinking were used. The product was dissolved in water in a desired concentration and pH was adjusted as needed. During the whole process in-process samples were drawn every 30 minutes to 2 hours as needed to monitor the reaction progress in each step and determine the composition as needed.

Example I

It was done following the general procedure. 13.50% of sulfuric acid was used. The reaction time for esterification, alkylation and crosslinking was 3 hours.

Example II

It was done following the general procedure. 15.00% of sulfuric acid was used. The reaction time for esterification, alkylation and crosslinking was 4 hours.

Example III

It was done following the general procedure. 15.00% of sulfuric acid was used. The reaction time for esterification, alkylation and crosslinking was 5 hours.

TABLE 1

Summary of the inventive examples

| Examples | MW of polyglycerol* | $H_2SO_4$ % | PTSA %*** | MW of the surface active products** |
|---|---|---|---|---|
| Example I | 8600 | 13.50% | | 17,000 |
| Example II | 7800 | 15.00% | | 18,000 |
| Example III | 3,800 | 15.00% | | 21,000 |

Note:
*weight average molecular weight determined by borate aqueous SEC method and calibrated with PEO/PEG standards;
**weight average molecular weight determined by SEC method using PLgel Guard Mixed-D column and DMSO as mobile phase, and calibrated with polysaccharide standards;
***p-toluenesulfonic acid.

Comparative Examples

Comparative Example I

It was done following the general procedure, except for that all the reaction starting materials were mixed together first at 100° C. and then gradually heated up to 150° C. 2% of sulfuric acid and 2% of PTSA were used. The reaction time for esterification, alkylation and crosslinking was 8 hours.

Comparative Example II

It was done following the general procedure, except for that all the reaction starting materials were mixed together first at 100-110° C. and then gradually heated up to 150° C. 1.92% of sulfuric acid and 1.81% of PTSA were used for the first four hours, followed by another addition of 2.75% of sulfuric to run 12 hours more. The reaction time tor esterification, alkylation and crosslinking was 16 hours.

TABLE 2

Summary of the comparative examples

| Comparative Examples | MW of polyglycero*l | $H_2SO_4$ % | PTSA %*** | MW of the surface active products** |
|---|---|---|---|---|
| Comparative Example I | 6,100 | 2.00% | 2.00% | 7,200 |
| Comparative Example II | 4,000 | 1.92% + 2.75% | 1.81% | 4,300 |

Note:
*weight average molecular weight determined by borate aqueous SEC method and calibrated with PEO/PEG standards;
**weight average molecular weight determined by SEC method using PLgel Guard Mixed-D column and DMSO as mobile phase, and calibrated with polysaccharide standards;
***p-toluenesulfonic acid.

The examples demonstrate that a particular amount of acid catalyst in the reaction formula and a particular low reactivity atmospheric environment conditions are unique to result in the unique surface active products (Table 1) efficiently, while the prior art conditions are inferior even with an additional organic acid catalyst and prolonged reaction time (Table 2).

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or more of the various embodiments described herein and/or incorporated herein.

The above disclosure is intended to be illustrative and not exhaustive. This description will suggest many variations and alternatives to one of ordinary skill in this art. The compositions and methods disclosed herein may comprise, consist of, or consist essentially of the listed components, or steps. As used herein the tents "comprising" means "including, but not limited to". As used herein the term "consisting essentially of" refers to a composition or method that includes the disclosed components or steps, and any other components or steps that do not materially affect the novel and basic characteristics of the compositions or methods. For example, compositions that consist essentially of listed ingredients do not contain additional ingredients that would affect the properties of those compositions. Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. Weight percent, percent by weight, % by weight, wt %, and the like are synonyms that refer to the concentration of a substance as the weight of that substance divided by the weight of the composition and multiplied by 100.

As used in this specification and the appended claims, the singular forms "a," "an," and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of synthesizing glycerol-based surface active products in a continuous process under a low reactivity atmospheric environment, comprising the steps of:
   a) reacting a reaction mass comprising at least glycerol monomer in the presence of a strong base catalyst of a concentration of above 2% at a temperature above 200 degrees C. which produces a first product comprising polyols which are both branched and cyclic, and a co-product comprising lactic acid, lactic salt, and any combination thereof,
   b) esterifying the first product in presence of an acid catalyst of a concentration above 5% at a temperature above 115 degrees C. to produce a second product, and
   c) alkylating the second product at a temperature above 115 degrees C. to form a third product, and
   d) crosslinking the third product at a temperature above 1.15 degrees C. to form an end product.

2. The method of claim 1 in which at least 0.1% of the produced polyols in the step a are:
   alkylated, esterified, crosslinked and any combination thereof.

3. The method of claim 1 in which the esterification reaction esterifies at least 0.1% of the co-product lactic acid to the produced polyols.

4. The method of claim 1 in which the esterification reaction is accomplished by adding at least one additional C2-C50 hydrocarbon acid in the step b.

5. The method of claim 1 in which alkylation is accomplished by adding at least one C4-C50 hydrocarbon alcohol or the like to the second product.

6. The method of claim 1 in which the glycerol monomer is at least in part glycerol from crude glycerin and the crude glycerin further comprises methyl esters, methanol, mong and inorganic salts and water.

7. The method of claim 1 in which the acid catalyst is selected from the group consisting of:
   phosphoric acid, sulfuric acid, p-toluenesulfonic acid, organic acid, Lewis acid and any combination thereof.

8. The method of claim 1 in which the base catalyst is selected from the group consisting of:
   NaOH, KOH, CsOH, a base stronger than NaOH, and any combination thereof.

9. The method of claim 1 in which the atmospheric environment is an atmospheric pressure of less than 760 mm Hg.

10. The method of claim 1 in which the atmospheric environment is a flow of an inert gas selected from the list of $N_2$, $CO_2$, He, other inert gases and any combination thereof and the flow is at a rate of 0.2 to 15 mol of inert gas per hour per mol of monomer (s).

11. The method of claim 1 in which the produced glycerol-based polyols In step a are selected from the group consisting of polyglycerols, polyglycerol derivatives, a polyol having both glycerol monomer units and non-glycerol monomer units and any combination thereof, the polyols have at least two hydroxyl groups.

12. The method of claim 1 in which at least a portion of the produced polyols in step a has both at least a 0.1 degree of branching and at least a 0.01 degree of cyclization, and at least a portion of the end product has both a 0.1 degree of branching and at least a 0.01 degree of cyclization.

13. The method of claim 1 in which the co-product is at least 1% by weight.

14. The method of claim 1 in which the produced glycerol-based polyols in step a are at least 166 Daltons in molecular weight, and the produced end product is at least 500 Daltons in molecular weight.

15. The method of claim 1 in which the glycerol-based polyols and the end product have a polydispersity of at least 1.

16. The method of claim 1 in which the acid catalyst is added portionwise in step b, step c, step d and any combination thereof.

17. The method of claim 1 in which the acid catalyst is 8.6% to 20.0%.

18. The method of claim 1 in which the glycerol-based polymer surface active products comprise at least one lactic acid, fatty acid, fatty alcohol a reaction product thereof and any combination thereof.

19. The method of claim 1 in which glycerol-based surface active products are produced by steps a, b, c and d and any combination thereof.

* * * * *